(12) United States Patent
Bohney et al.

(10) Patent No.: US 8,695,352 B2
(45) Date of Patent: Apr. 15, 2014

(54) BAFFLE ASSEMBLY FOR BLEED AIR SYSTEM OF GAS TURBINE ENGINE

(75) Inventors: Nathan J. Bohney, San Diego, CA (US); Christopher J. Meyer, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 74 days.

(21) Appl. No.: 13/547,124

(22) Filed: Jul. 12, 2012

(65) Prior Publication Data

US 2014/0013767 A1 Jan. 16, 2014

(51) Int. Cl.
*F02C 6/04* (2006.01)

(52) U.S. Cl.
USPC .......................................................... 60/785

(58) Field of Classification Search
USPC .................................... 60/752–760, 782, 785
See application file for complete search history.

(56) References Cited

U.S. PATENT DOCUMENTS

| | | | |
|---|---|---|---|
| 4,747,262 A * | 5/1988 | Maynard ...................... 60/39.23 |
| 4,805,397 A * | 2/1989 | Barbier et al. .................. 60/800 |
| 5,117,637 A | 6/1992 | Howell |
| 5,351,474 A * | 10/1994 | Slocum et al. ................ 60/39.23 |
| 5,640,840 A * | 6/1997 | Briesch ............................ 60/775 |
| 6,216,438 B1 * | 4/2001 | Aschenbruck et al. ......... 60/785 |
| 6,314,739 B1 | 11/2001 | Howell |
| 6,334,298 B1 | 1/2002 | Aicholtz |
| 6,568,188 B2 * | 5/2003 | Kolman et al. ................. 60/760 |
| 6,588,195 B2 * | 7/2003 | Negulescu ...................... 60/785 |
| 7,721,437 B2 | 5/2010 | Howell |
| 2004/0250549 A1 | 12/2004 | Liebe |
| 2008/0016878 A1 * | 1/2008 | Kirby ............................. 60/782 |

FOREIGN PATENT DOCUMENTS

GB  2353589  2/2001

OTHER PUBLICATIONS

Baffle Retainer (Prior to Jul. 1, 2011), 1 page.

* cited by examiner

*Primary Examiner* — Phutthiwat Wongwian

(57) ABSTRACT

A baffle assembly for a housing of a combustor system of a gas turbine engine is provided. The baffle assembly includes a baffle retainer and a baffle. The baffle retainer includes a retainer tube and a collar. The retainer tube is received within a bleed port of the housing. The collar is defined at an upper end of the retainer tube and is configured to rest against the housing. The baffle includes a baffle tube rigidly attached to an inner surface of the retainer tube.

21 Claims, 4 Drawing Sheets

BAFFLE ASSEMBLY FOR BLEED AIR SYSTEM OF GAS TURBINE ENGINE

TECHNICAL FIELD

The present disclosure relates to a baffle assembly, and more particularly to a baffle assembly for a bleed air system that is configured to exhaust heat from a combustor system of a gas turbine engine.

BACKGROUND

A baffle assembly provided in a gas turbine engine to exhaust gases and heat from a combustor system of the gas turbine engine. U.S. Pat. No. 5,117,637 relates to a gas turbine engine combustor dome assembly including a dome, a mounting ring, a baffle, and a carburetor. The dome has a dome eyelet. The mounting ring is fixedly joined to the dome around the eyelet. The baffle is fixedly joined to the mounting ring. The carburetor is joined to the mounting ring for providing a fuel/air mixture through the mounting ring with a predetermined relationship to the baffle for controlling pattern factor.

SUMMARY

In one aspect, the present disclosure provides a baffle assembly for a housing of a combustor system of a gas turbine engine. The baffle assembly includes a baffle retainer and a baffle. The baffle retainer includes a retainer tube and a collar. The retainer tube is received within a bleed port of the housing. The collar is defined at an upper end of the retainer tube and is configured to rest against the housing. The baffle includes a baffle tube rigidly attached to an inner surface of the retainer tube.

In another aspect, the present disclosure provides the combustor system of the gas turbine engine. The combustor system includes the housing, a liner, one or more injectors, one or more combustors, and a bleed air system. The liner is attached on an internal wall of the housing. The injectors are disposed within the housing. The combustors are disposed within the housing and operatively connected to the injectors. The bleed air system includes the baffle assembly connected to the housing. The baffle assembly includes the baffle retainer and the baffle. The baffle retainer includes the retainer tube and the collar. The retainer tube is received within the bleed port of the housing. The collar is defined at the upper end of the retainer tube and is configured to rest against the housing. The baffle includes the baffle tube rigidly attached to the inner surface of the retainer tube.

In another aspect, the present disclosure provides a gas turbine engine including a compressor system, and the combustor system. The combustor system includes the housing, the liner, one or more injectors, one or more combustors, and the bleed air system. The liner is attached on an internal wall of the housing. The injectors are disposed within the housing. The combustors are disposed within the housing and operatively connected to the injectors. The bleed air system includes the baffle assembly connected to the housing. The baffle assembly includes the baffle retainer and the baffle. The baffle retainer includes the retainer tube and the collar. The retainer tube is received within the bleed port of the housing. The collar is defined at the upper end of the retainer tube and is configured to rest against the housing. The baffle includes the baffle tube rigidly attached to the inner surface of the retainer tube.

Other features and aspects of this disclosure will be apparent from the following description and the accompanying drawings.

DETAILED DESCRIPTION

Figure 1:
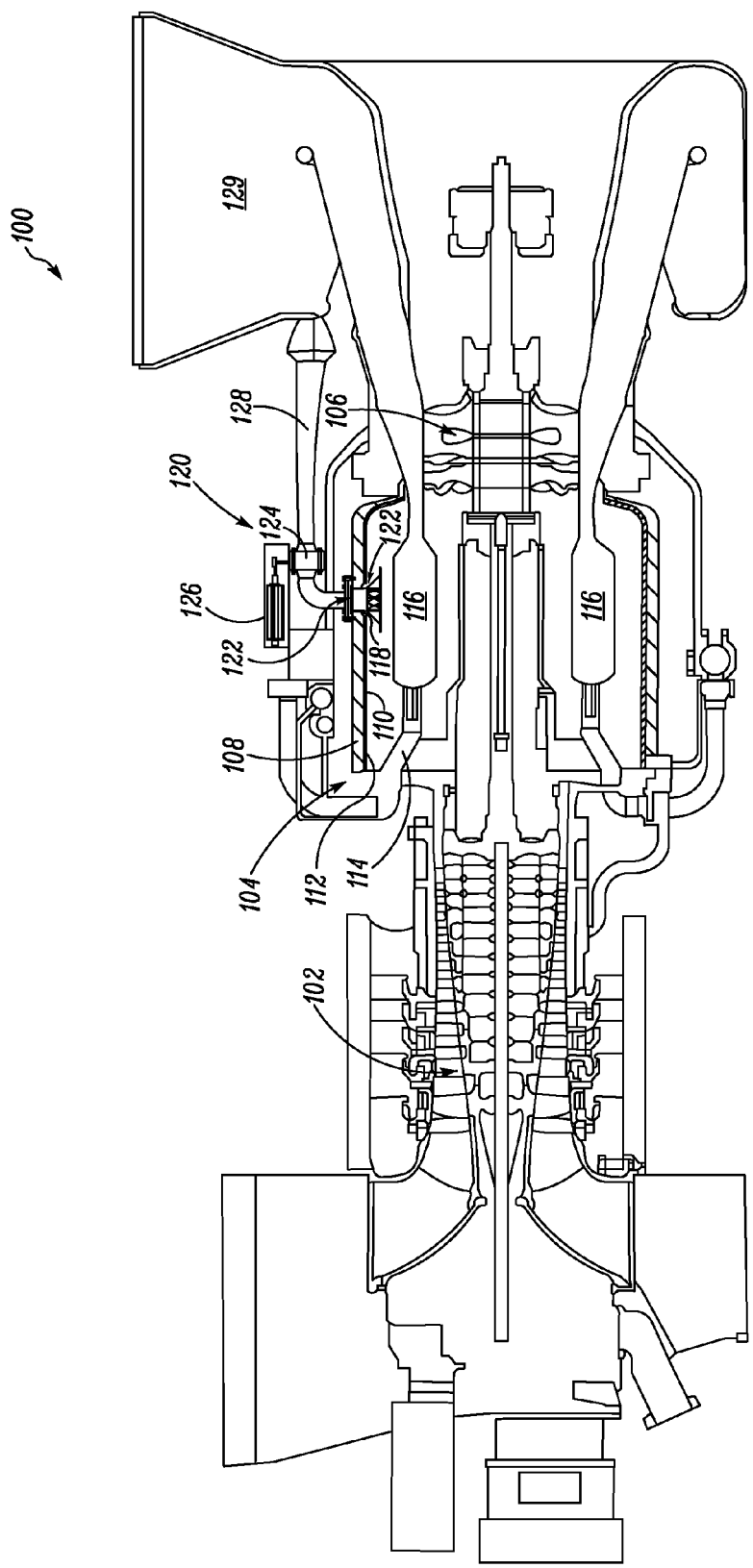
FIG. 1 is a sectional view of a gas turbine engine in accordance with an embodiment of the present disclosure.

The present disclosure relates to a baffle assembly 122 of a combustor system 104 of a gas turbine engine 100. FIG. 1 shows a sectional view of a gas turbine engine 100 in which disclosed embodiments may be implemented. The gas turbine engine 100 may be of any type. In one embodiment, the gas turbine engine 100 may be an industrial turbine engine, for example, but not limited to, an axial flow turbine used for power generation or driving mechanical assemblies, or in jet propulsion systems. As shown in FIG. 1, the gas turbine engine 100 may embody an axial flow industrial turbine which may be used for power generation.

As shown in FIG. 1, the gas turbine engine 100 includes a compressor system 102, a combustor system 104, and a turbine system 106. The compressor system 102 may compress air and operatively provide the compressed air to various components of the combustor system 104 and the turbine system 106. The compressor system 102 may be, but not limited to, a rotary compressor. Further, the compressor system 102 may be a single stage or a multistage compressor. In FIG. 1, the compressor system 102 may embody a multistage rotary compressor.

The combustor system 104 includes a housing 108 and a liner 110 attached on an internal wall 112 of the housing 108. The combustor system 104 further includes one or more injectors 114 and combustors 116 disposed within the housing 108. The injectors 114 may be adapted to receive compressed air from the compressor system 102 and supply a mixture of fuel and air to the combustors 116. The combustors 116 are annularly disposed within the housing 108 and are operatively connected to the injectors 114. The combustors 116 combust the mixture of fuel and air to generate energy. This energy may be utilized to drive the turbine system 106 which may in turn use some part of the energy in driving the compressor system 102 while concurrently using the remaining part of the energy to do work.

During combustion, some of the energy may be released in the form of heat. Therefore, one or more bleed ports 118 may be provided in the housing 108 to help vent out this heat into the atmosphere. A person having ordinary skill in the art will acknowledge that this heat may accumulate in the vicinity of the bleed port 118 and may produce hot spots therein. Further, prolonged routing of this heat via the bleed ports 118 may intensify the production of the hot spots in the vicinity of the bleed port 118 thus damaging the surrounding liner 110. Hence, the bleed port 118 needs to be implemented with a bleed air system 120 that helps dissipate and exhaust the heat at a position away from the liner 110.

Furthermore, the combustor system 104 includes the bleed air system 120 configured to exhaust the heat from the combustors 116. The bleed air system 120 includes a baffle assembly 122, a valve element 124, and an actuator 126. The baffle assembly 122 is connected to the housing 108. In an embodiment, the baffle assembly 122 may be fluidly connected to the valve element 124 and the actuator 126. The valve element 124 may be used to regulate the flow of exhaust while the actuator 126 may control the valve element 124. Further, in this embodiment, a pipe 128 may be used to connect the baffle assembly 122 to an exhaust system 129 via the valve element 124.

Figure 2:
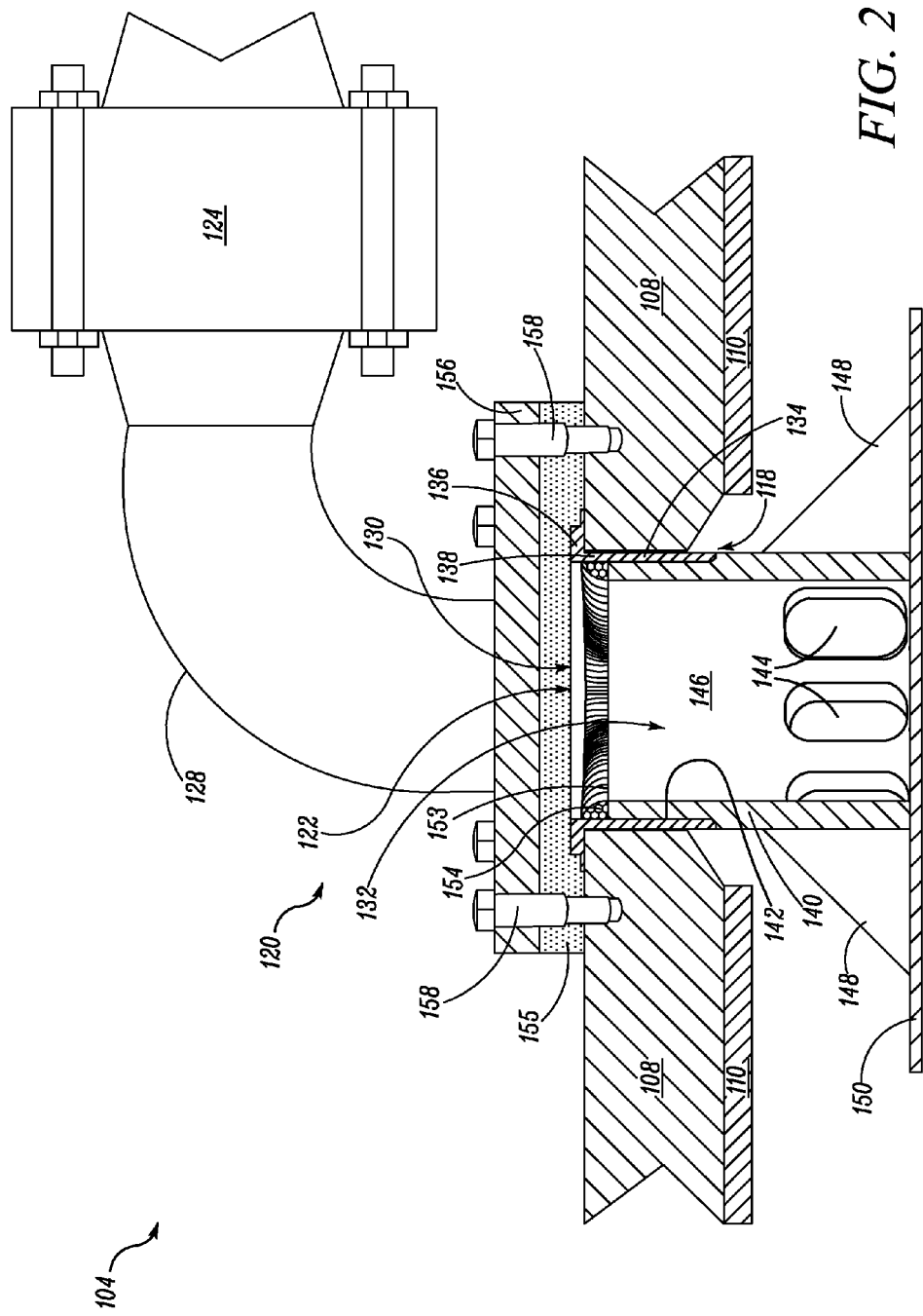
FIG. 2 is a sectional view of a combustor system of the gas turbine engine.

As shown in FIG. 2, the baffle assembly 122 includes a baffle retainer 130 and a baffle 132. The baffle retainer 130 includes a retainer tube 134 and a collar 136. The retainer tube 134 is received within the bleed port 118 of the housing 108. The collar 136 is defined at an upper end 138 of the retainer tube 134 and is configured to rest against the housing 108. The baffle 132 includes a baffle tube 140 rigidly attached to an inner surface 142 of the retainer tube 134.

In an embodiment, the baffle tube 140 may define one or more openings 144 extending into a venting pathway 146. The openings 144 exhaust the combusted products and the associated heat from within the housing 108. The number of openings 144 provided on the baffle 132 may vary based on the amount of exhaust of heat and subsequent cooling required. Further, the openings 144 are spaced from one another based on a pre-determined flow pattern of the combusted products and the associated heat within the housing 108. Furthermore, a size and shape of each of the openings 144 may be selected such that a desired amount of heat is exhausted from the housing 108 and a corresponding amount of cooling is achieved therein. Hence, it is to be understood that the substantially rectangular shape of each of the openings 144 as shown in FIG. 2 is only exemplary in nature. A person having ordinary skill in the art will acknowledge that a square, round, oblong, pentagonal, octagonal or any other shape commonly known in the art may be used to form each of the openings 144.

In another embodiment, the baffle 132 may further include multiple support ribs 148, and a plate 150. The support ribs 148 may be rigidly attached to the baffle tube 140. The plate 150 may be rigidly connected to the baffle tube 140 via the plurality of support ribs 148. In this embodiment, the support ribs 148 may be rigidly connected to the plate 150 and the baffle tube 140 by welding. However, a person having ordinary skill in the art will acknowledge that the rigid connection of the support ribs 148 to the baffle tube 140 and the plate 150 by welding is only exemplary in nature and that the rigid connections may be accomplished any other methods and means known in the art.

Typically, a size and shape of each of the support ribs 148 may be selected such that a desired amount of strength is accomplished in the rigid attachment to the baffle tube 140 and the plate 150. Further, the size and shape of the each of the support ribs 148 may also be based on a desired distribution of stress concentration in the support ribs 148. Hence, a triangular shape of the support ribs 148 as shown in FIG. 2 is only exemplary in nature. A person having ordinary skill in the art will acknowledge that a square, curved, curvilinear, or any other shape commonly known in the art may be used to form the support ribs 148.

As disclosed earlier, the baffle retainer 130 includes the retainer tube 134 and the collar 136. As shown in FIG. 2, the retainer tube 134 is received within the bleed port 118 of the housing 108. The collar 136 is defined at an upper end 138 of the retainer tube 134 and is configured to rest against the housing 108. Specifically, the collar 136 may be configured to rest against an outer surface 152 of the housing 108.

In an embodiment as shown in FIG. 2, an upper end 153 of the baffle tube 140 may be rigidly attached to the inner surface 142 of the retainer tube 134. In this embodiment, the upper end 153 of the baffle tube 140 may be rigidly attached to the inner surface 142 of the retainer tube 134 by welding. Thus, the weld 154 located between the upper end 153 of the baffle tube 140 and the inner surface 142 of the retainer tube 134 rigidly attaches the baffle retainer 130 to the baffle 132 thereby securing the baffle 132 to the housing 108.

In the embodiment as shown in FIGS. 1 and 2, the pipe 128 may be flangibly secured to the housing 108. A gasket 155, preferably, an air-tight gasket 155, may be disposed in between the flange 156 and the collar 136 of the baffle retainer 130 to prevent combusted products and associated heat in the housing 108 from escaping directly into the atmosphere. As known to a person having ordinary skill in the art, the gasket 155 may be made of a resilient material, for example, rubber. In an embodiment, bolts 158 may be used to secure the flange 156 of the pipe 128 to the housing 108. The bolts 158 may compress the gasket 155 since the gasket 155 is disposed between the flange 156 and the collar 136 resting on the housing 108.

Figure 3:
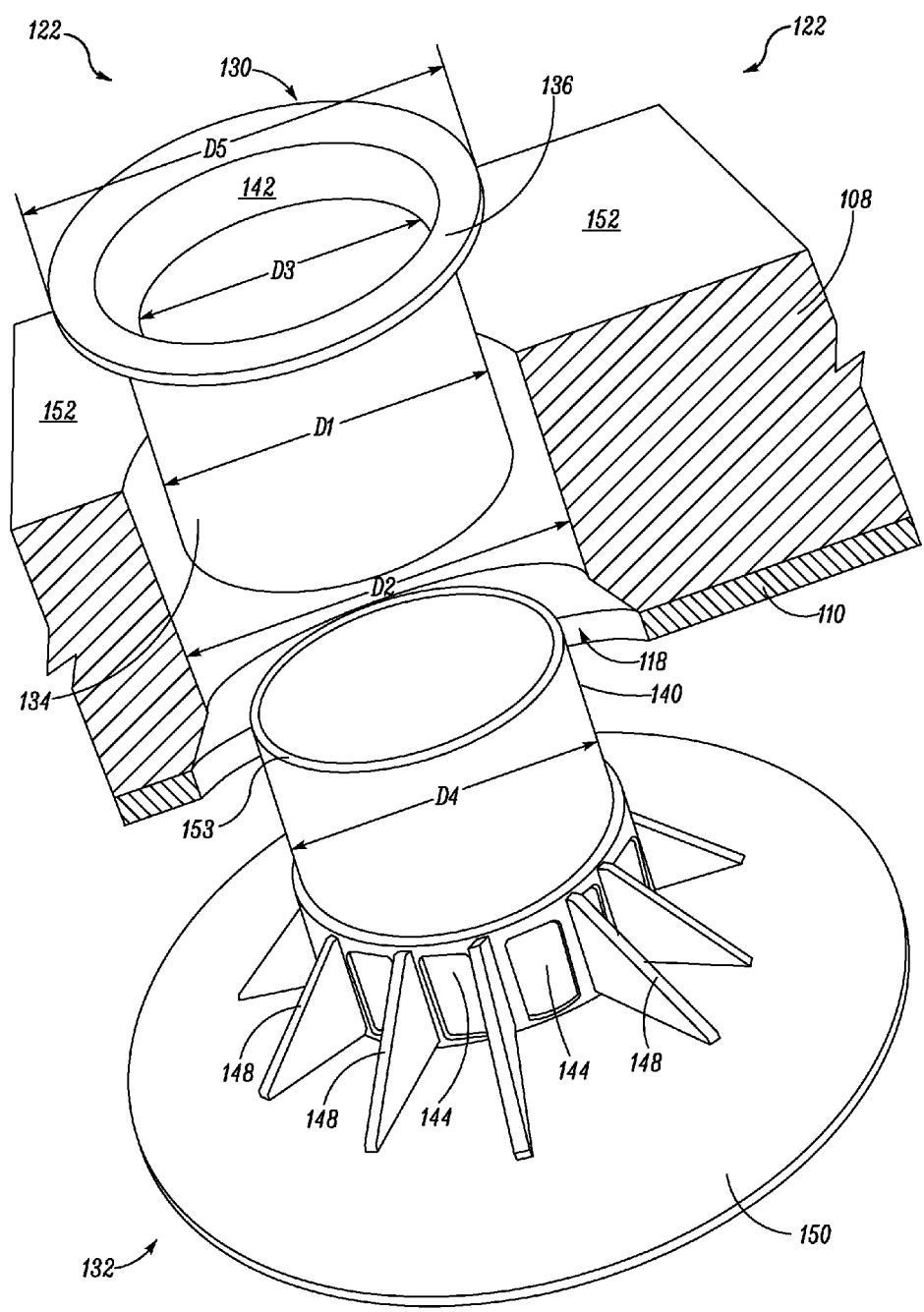
FIG. 3 is a sectional view of a housing with an exploded view of a baffle assembly.
Figure 4:
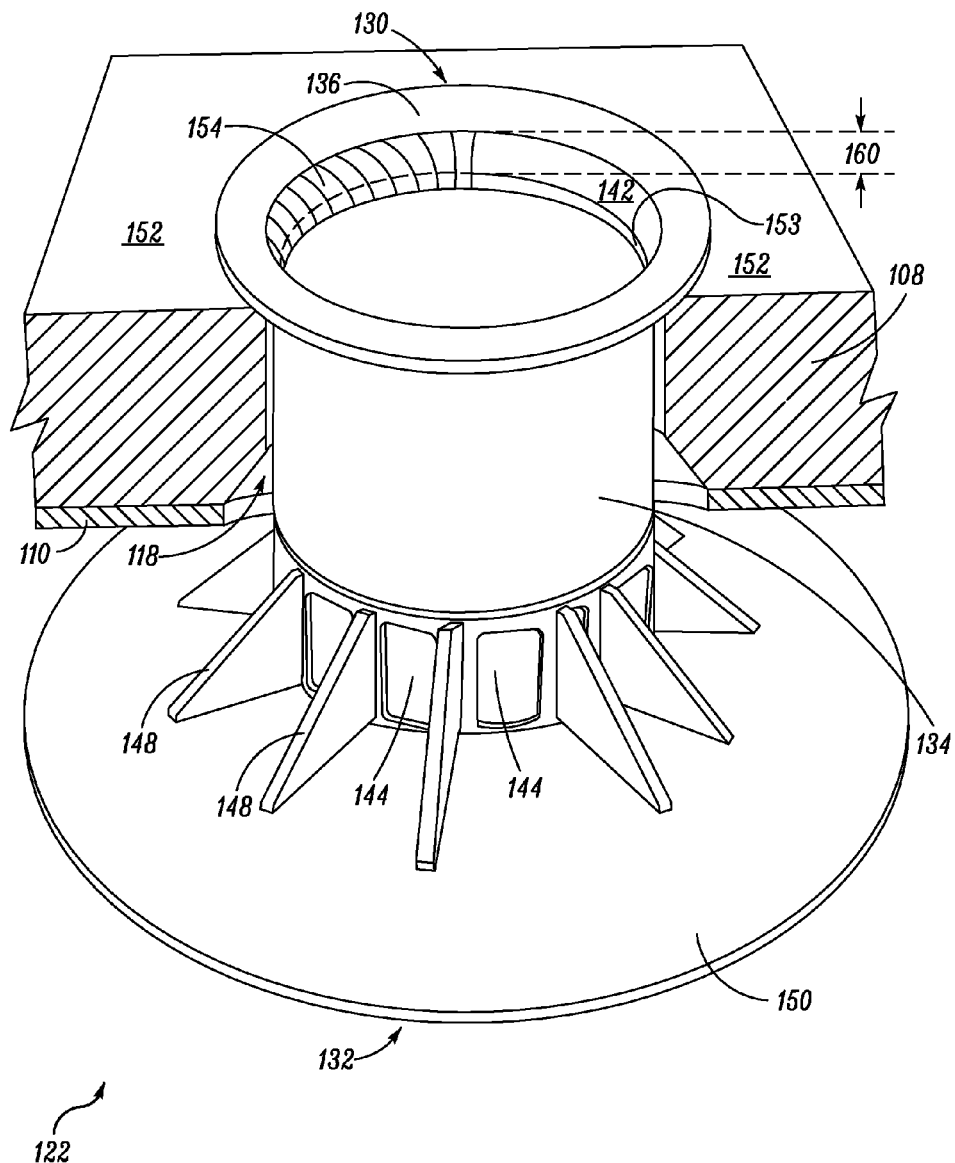
FIG. 4 is a sectional view of the housing with an assembled view of the baffle assembly.

Typically, a length and cross section of the retainer tube 134 may be selected based on various constraints imposed by a spatial geometry and construction of the housing 108, and the bleed port 118 therein. Further, the length and cross section of the retainer tube 134 may be chosen such that the retainer tube 134 abuts the baffle 132 and the bleed port 118 with close tolerances. As understood by a person having ordinary skill in the art, various constraints in the length and cross section of the retainer tube 134 stem from the spaces available for the retainer tube 134 to receive the baffle 132 while taking into consideration the presence of other components associated with the housing 108. Hence, a substantially cylindrical cross section of the retainer tube 134 corresponding to a substantially cylindrical retainer tube 134 as shown in FIGS. 3 and 4 is only exemplary in nature. A person having ordinary skill in the art will acknowledge that any other suitable shape and cross-section known in the art may be used to form the retainer tube 134.

In an embodiment as shown in FIG. 3, an outer diameter D1 of the retainer tube 134 is lesser than an inner diameter D2 of the bleed port 118 of the housing 108. Further, an inner diameter D3 of the retainer tube 134 is greater than an outer diameter D4 of the baffle tube 140. Furthermore, in this embodiment, an outer diameter D5 of the collar 136 may be greater than an inner diameter D2 of the bleed port 118. The baffle retainer 130, the baffle 132, and the bleed port 118 constituted by the aforesaid dimensions may ensure a snug fit of the baffle retainer 130 within the bleed port 118 while the baffle tube 140 is also rigidly attached to the inner surface 142 of the retainer tube 134. Further, the above arrangement may also ensure that the collar 136 of the baffle retainer 130 rests against the outer surface 152 of the housing 108. However, it is to be understood that all the dimensions of the baffle retainer 130, the baffle 132, and the bleed port 118 mentioned in the above embodiment are only exemplary in nature. A person having ordinary skill in the art will acknowledge that the dimensions of the baffle retainer 130 may be changed during manufacturing depending on the specifications of the baffle 132 and the bleed port 118.

In an embodiment as shown in FIG. 4, the upper end 153 of the baffle tube 140 may be rigidly attached to the inner surface 142 of the retainer tube 134 by welding. In this embodiment, the upper end 153 of the baffle tube 140 may be rigidly attached to the inner surface 142 of the retainer tube 134 via a weld gap 160.

As can be seen from FIG. 4, the weld gap 160 may be created by raising the baffle retainer 130 to a position where a level of the collar 136 is above the upper end 153 of the baffle tube 140. During welding, the raised position of the baffle retainer 130 with respect to the baffle 132 allows a technician to conveniently weld the upper end 153 of the baffle tube 140 to the inner surface 142 of the retainer tube 134. The baffle retainer 130 may be raised to a position such that the weld gap 160 created completely fills up with the weld 154 during welding and the upper end 153 of the baffle tube 140 may be effectively welded to the inner surface 142 of the retainer tube 134.

INDUSTRIAL APPLICABILITY

As disclosed earlier, excess heat may create hot spots within the housing 108. Various components in the housing 108 such as the liner 110 may be able to withstand heat up to a certain threshold temperature. When a working temperature of the liner 110 or other components exceeds the threshold temperature, one or more components and/or the liner 110 may fail. Furthermore, the turbine system 106 operates at a lower temperature than the combustors 116. Hence, the excess heat or hot spots may negatively impact the functioning of the turbine system 106. The baffle assembly 122 helps to exhaust this excess heat and prevent the formation of the hot spots.

Conventionally, baffle securement devices employ a retaining ring and a shim plate. The shim plate usually has an inner diameter that is less than the inner diameter D2 of the bleed port 118. The shim plate is rested on the housing 108 while the retaining ring is disposed above the shim plate. The shim plate prevents the retaining ring from plunging into the bleed port 118. The retaining ring is directly welded to the outer surface of the baffle 132. Hence, the area of weld encircles the outer surface of the baffle 132. This weld area may be subjected to the weight of the baffle 132 in addition to the thermal effects and vibrational effects during operation of the gas turbine engine 100. Hence, the weld area may be a high stress zone prone to failure.

Thus, failure of the weld between the retaining ring and the outer surface of the baffle 132 may cause detachment of the baffle 132 from the retaining ring and as a result of which, the baffle 132 may spin and jam against the shim plate causing damage to the neighboring components. Furthermore, the baffle 132 may break loose and fall into the housing 108 causing damage to the combustors 116 present within. Hence, the baffle 132 needs to be secured to the housing 108 in a safe manner.

Further, a manufacturer often faces difficulty in determining a suitable location of rigid attachment between the baffle securement device and the baffle 132. This may be due to the space constraints presented by the presence of other components of the gas turbine engine 100. Hence, the manufacturer may be left with little or no choice to determine the location of the weld areas between the baffle securement device and the baffle 132. Consequently, the welded areas between the baffle retainer 130 and the baffle 132 become minimal and highly stress prone.

Keeping in mind the aforesaid consequences, the location of the weld, as discussed in this disclosure, is positioned between the collar 136 of the baffle retainer 130 and the upper end 153 of the baffle tube 140. This location ensures that the weld area may be a lower stress zone due to a possibility of creating a wider weld gap 160 depending on the requirement. Further, the position of the weld 154 as disclosed in this disclosure allows easy access to the technician during welding process. This wider weld gap 160 may be achieved by raising the collar 136 of the baffle retainer 130 with respect to the upper end 153 of the baffle tube 140 as disclosed earlier. Thus, the wider weld gap 160 may allow a larger amount of weld 154 to be filled and subsequently dissipates the stresses to the wider weld 154 in the weld gap 160. Hence, the weld 154 positioned on this wider weld gap 160 in addition to the configuration of the baffle 132 and the baffle retainer 130 may not be easily affected by stresses that may potentially cause failure of the welds and subsequently detachment of the baffle 132.

As shown in FIG. 1, the pipe 128 connects the baffle 132 to the exhaust system 129 of the gas turbine engine 100. Further as shown in FIG. 2, this pipe 128 is flangibly secured to the housing 108. The gasket 155 may be disposed in between the flange 156 and the collar 136 of the baffle retainer 130 to prevent combusted products and associated heat in the housing 108 from escaping directly into the atmosphere. As disclosed earlier, bolts 158 used to secure the flange 156 of the pipe 128 to the housing 108 may compress this gasket 155 since the gasket 155 is disposed between the flange 156 and the collar 136 resting on the housing 108.

Generally, weld areas protruding from a top surface of the retaining ring of the conventional baffle securement devices caused the welds to indent and eat away the resilient material of the compressed gasket 155. This indentation and eat-aways may be more pronounced when heat influences the resiliency of the gasket 155 under an operating condition of the gas turbine engine 100. Thus, the gasket 155 may crack at points proximal to the areas of bolting and welding locations. Therefore, a service life of the gasket 155 may reduce. The provision of the weld gap 160 between the collar 136 of the baffle retainer 130 and the upper end 153 of the baffle tube 140, as mentioned in the present disclosure, may allow the manufacturer to conveniently weld the baffle retainer 130 to the baffle 132 while avoiding the indentation and eat-aways of the gasket 155 after assembly. Further, the location of the weld gap 160 may avoid frequent repairs and replacement of gaskets 155 in the gas turbine engine 100. Subsequently, down times required for repairs and replacement of failed components within the gas turbine engine 100 may be reduced. Hence, the configuration of the baffle retainer 130 and the baffle 132 discussed in the present disclosure may increase overall productivity and profitability associated with the gas turbine engine 100.

Further, with regards to ease and convenience of manufacturing, the baffle retainer 130 of the present disclosure may be manufactured by machining a monolithic bar stock or otherwise manufactured to be constructed from a single piece. In conventional baffle securement devices, the assembly of separate components such as retaining ring, shim and the like, required the manufacturer to produce the separate components and assemble them with various intermediary connections between the components. Thus, the baffle securement devices were achieved after tedious and time-consuming processes of assembly of the various components. Hence, the monolithic structure of the baffle retainer 130 may entail a single step machining process such as turning a bar stock. Subsequently, during assembly, the baffle retainer 130 may be merely placed within the bleed port 118 of the housing 108. Hence, the gas turbine engine 100 may be quickly set up with minimal effort thus saving time and expense.

While aspects of the present disclosure have been particularly shown and described with reference to the embodiments above, it will be understood by those skilled in the art that various additional embodiments may be contemplate 150 d by the modification of the disclosed machine, systems and methods without departing from the spirit and scope of what is disclosed. Such embodiments should be understood to fall within the scope of the present disclosure as determined based upon the claims and any equivalents thereof.

We claim:

1. A baffle assembly for a housing of a combustor system of a gas turbine engine, the baffle assembly comprising:
a baffle retainer including:
a retainer tube received within a bleed port of the housing; and
a collar defined at an upper end of the retainer tube, the collar configured to rest against the housing; and
a baffle including:
a baffle tube rigidly attached to an inner surface of the retainer tube for bleeding air from within the housing to an exhaust system.

2. The baffle assembly of claim 1, wherein an upper end of the baffle tube is rigidly attached to the inner surface of the retainer tube.

3. The baffle assembly of claim 1, wherein an outer diameter of the retainer tube is lesser than an inner diameter of the bleed port.

4. The baffle assembly of claim 3, wherein an inner diameter of the retainer tube is greater than an outer diameter of the baffle tube.

5. The baffle assembly of claim 4, wherein an outer diameter of the collar is greater than an inner diameter of the bleed port.

6. The baffle assembly of claim 1, wherein the baffle further includes:
a plurality of support ribs rigidly attached to the baffle tube; and
a plate rigidly connected to the tube via the plurality of support ribs.

7. The baffle assembly of claim 1, wherein the baffle tube defines one or more openings extending into a venting pathway.

8. A combustor system of a gas turbine engine comprising:
a housing;
a liner attached on an internal wall of the housing;
one or more injectors disposed within the housing;
one or more combustors disposed within the housing and operatively connected to the injectors; and
a bleed air system including:
a baffle assembly connected to the housing, the baffle assembly including:
a baffle retainer including:
a retainer tube received within a bleed port of the housing; and
a collar defined at an upper end of the retainer tube, the collar configured to rest against the housing; and
a baffle including:
a baffle tube rigidly attached to an inner surface of the retainer tube.

9. The combustor system of claim 8, wherein an upper end of the baffle tube is rigidly attached to the inner surface of the retainer tube.

10. The combustor system of claim 8, wherein an outer diameter of the retainer tube is lesser than an inner diameter of the bleed port.

11. The combustor system of claim 10, wherein an inner diameter of the retainer tube is greater than an outer diameter of the baffle tube.

12. The combustor system of claim 11, wherein an outer diameter of the collar is greater than an inner diameter of the bleed port.

13. The combustor system of claim 8, wherein the baffle further includes:
a plurality of support ribs rigidly attached to the baffle tube; and
a plate rigidly connected to the tube via the plurality of support ribs.

14. The combustor system of claim 8, wherein the baffle tube defines one or more openings extending into a venting pathway.

15. A gas turbine engine comprising:
a compressor system;
a combustor system including:
a housing;
a liner attached on an internal wall of the housing;
one or more injectors disposed within the housing;
one or more combustors disposed within the housing and operatively connected to the injectors; and
a bleed air system including:
a baffle assembly connected to the housing, the baffle assembly including:
a baffle retainer including:
a retainer tube received within a bleed port of the housing; and
a collar defined at an upper end of the retainer tube, the collar configured to rest against the housing; and
a baffle including:
a baffle tube rigidly attached to an inner surface of the retainer tube.

16. The gas turbine engine of claim 15, wherein an upper end of the baffle tube is rigidly attached to the inner surface of the retainer tube.

17. The gas turbine engine of claim 15, wherein an outer diameter of the retainer tube is lesser than an inner diameter of the bleed port.

18. The gas turbine engine of claim 17, wherein an inner diameter of the retainer tube is greater than an outer diameter of the baffle tube.

19. The gas turbine engine of claim 18, wherein an outer diameter of the collar is greater than an inner diameter of the bleed port.

20. The gas turbine engine of claim 15, wherein the baffle further includes:
a plurality of support ribs rigidly attached to the baffle tube; and
a plate rigidly connected to the tube via the plurality of support ribs.

21. The gas turbine engine of claim 15, wherein the baffle tube defines one or more openings extending into a venting pathway.

* * * * *